(12) United States Patent
Wei et al.

(10) Patent No.: US 12,177,827 B2
(45) Date of Patent: Dec. 24, 2024

(54) TRANSMITTING GROUP SCHEDULING CONTROL INFORMATION OVER A PHYSICAL DOWNLINK SHARED CHANNEL

(71) Applicant: QUALCOMM Incorporated, San Diego, CA (US)

(72) Inventors: Chao Wei, Beijing (CN); Changlong Xu, Beijing (CN); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 501 days.

(21) Appl. No.: 17/427,854

(22) PCT Filed: Feb. 8, 2019

(86) PCT No.: PCT/CN2019/074734
§ 371 (c)(1),
(2) Date: Aug. 2, 2021

(87) PCT Pub. No.: WO2020/160689
PCT Pub. Date: Aug. 13, 2020

(65) Prior Publication Data
US 2022/0132522 A1    Apr. 28, 2022

(51) Int. Cl.
*H04W 72/121*    (2023.01)
*H04W 72/23*    (2023.01)

(52) U.S. Cl.
CPC ......... *H04W 72/121* (2013.01); *H04W 72/23* (2023.01)

(58) Field of Classification Search
CPC .................. H04W 72/121; H04W 72/23
See application file for complete search history.

(56) References Cited

U.S. PATENT DOCUMENTS

| 2011/0194511 | A1  | 8/2011 | Chen et al. |
| 2014/0105158 | A1  | 4/2014 | Kim et al. |
| 2014/0169319 | A1* | 6/2014 | Yang ............... H04W 72/21 370/329 |

(Continued)

FOREIGN PATENT DOCUMENTS

| CN | 103687034 A | 3/2014 |
| CN | 103841603 A | 6/2014 |
| CN | 104735720 A | 6/2015 |

OTHER PUBLICATIONS

Supplementary European Search Report—19914354.6—Search Authority—Munich—Aug. 8, 2022.

(Continued)

*Primary Examiner* — Sharmin Chowdhury
(74) *Attorney, Agent, or Firm* — Harrity & Harrity, LLP

(57) ABSTRACT

Methods, systems, and devices for wireless communication are described. A wireless device may obtain group control information in a group common physical downlink shared channel (PDSCH), determine resources for communicating on a shared channel based on the group control information, and communicate on the resources of the shared channel. A base station may configure a user equipment (UE) group comprising at least one UE, transmit, in a group common physical downlink shared channel (PDSCH), group control information for scheduling the at least one UE for communicating on a shared channel, and communicate on the shared channel with the at least one UE.

30 Claims, 9 Drawing Sheets

(56) References Cited

U.S. PATENT DOCUMENTS

| | | | | |
|---|---|---|---|---|
| 2014/0169324 | A1 | 6/2014 | Seo et al. | |
| 2015/0237649 | A1* | 8/2015 | Zhang | H04W 72/21 |
| | | | | 370/329 |
| 2017/0332359 | A1* | 11/2017 | Tsai | H04B 7/0617 |
| 2018/0049060 | A1* | 2/2018 | Fujishiro | H04W 72/30 |
| 2018/0279297 | A1* | 9/2018 | Nogami | H04L 1/1887 |
| 2019/0159168 | A1* | 5/2019 | Wang | H04W 68/02 |
| 2019/0320396 | A1* | 10/2019 | Bagheri | H04W 52/34 |
| 2020/0344032 | A1* | 10/2020 | Yang | H04L 5/0053 |
| 2021/0321360 | A1* | 10/2021 | Wong | H04W 68/00 |
| 2021/0400699 | A1* | 12/2021 | Nory | H04L 1/1819 |

OTHER PUBLICATIONS

International Search Report and Written Opinion—PCT/CN2019/074734—ISA/EPO—Oct. 29, 2019.

* cited by examiner

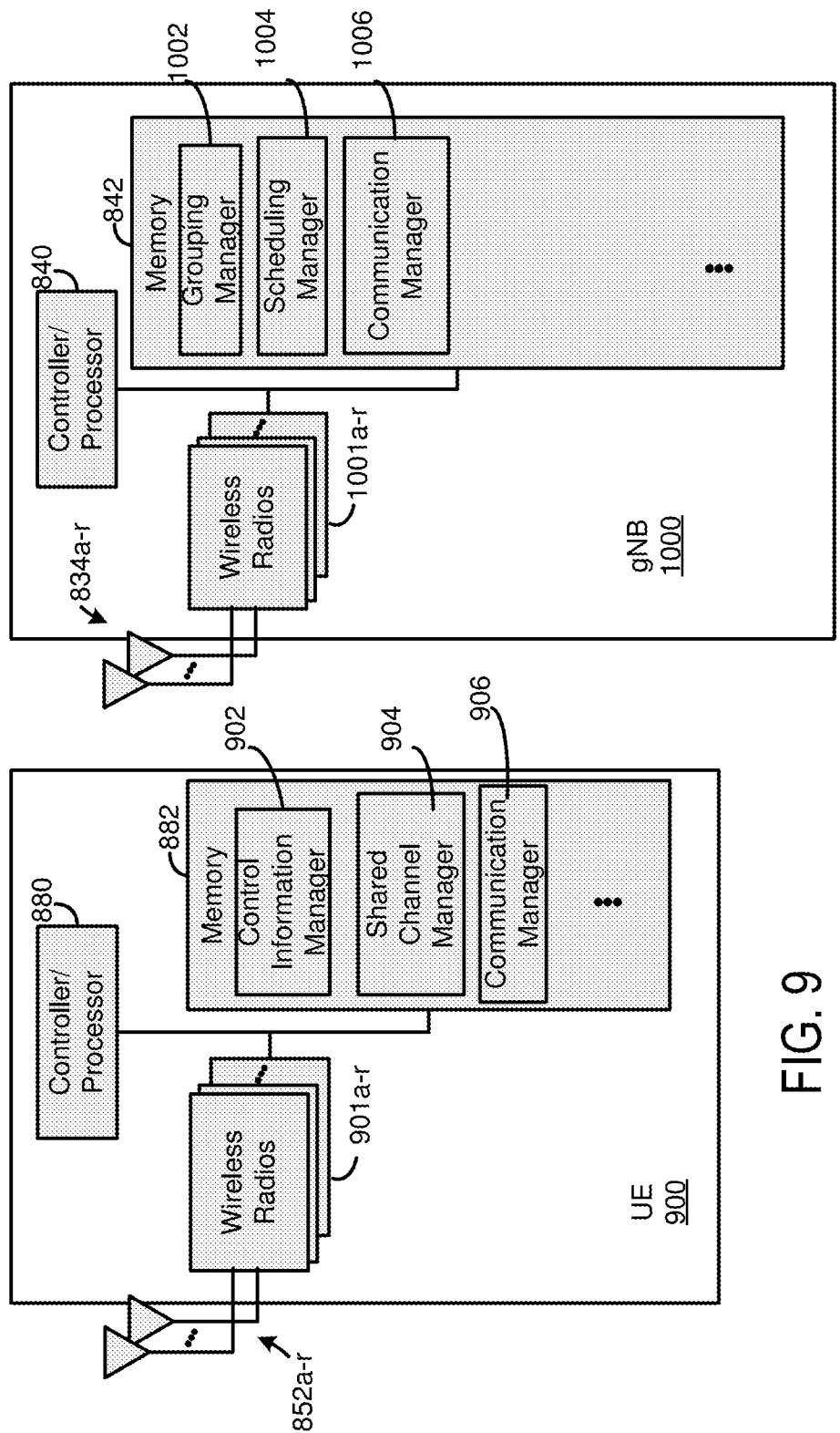

TRANSMITTING GROUP SCHEDULING CONTROL INFORMATION OVER A PHYSICAL DOWNLINK SHARED CHANNEL

This application is a 371 national stage application of PCT Application No. PCT/CN2019/074734, filed Feb. 8, 2019, which is assigned to the assignee hereof, and is incorporated herein by reference in its entirety.

BACKGROUND

The following relates to wireless communication and transmission of group scheduling control information.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

SUMMARY

The described techniques relate to improved methods, systems, devices, or apparatuses that support transmission of group control information in a Physical Downlink Shared Channel. A method of wireless communication is described. The method may include obtaining, at a user equipment, group control information in a group common PDSCH, determining resources for communicating on a shared channel based on the group control information, and communicating on the resources of the shared channel.

An apparatus for wireless communication is described. The apparatus may include a processor, a memory in electronic communication with the processor, and instructions stored in the memory. The instructions may be executable by the processor to cause the apparatus to obtain, at a user equipment, group control information in a group common PDSCH, determine resources for communicating on a shared channel based on the group control information, and communicate on the resources of the shared channel.

A non-transitory computer readable medium storing code for wireless communication is described. The code may include instructions executable by a processor to obtain, at a user equipment, group control information in a group common PDSCH, determine resources for communicating on a shared channel based on the group control information, and communicate on the resources of the shared channel.

Another apparatus for wireless communication is described. The apparatus may include means for obtaining, at a user equipment, group control information in a group common PDSCH, means for determining resources for communicating on a shared channel based on the group control information, and means for communicating on the resources of the shared channel.

Some examples of the method, apparatuses, or non-transitory computer-readable medium described herein may further include processes, features, means, or instructions for receiving a group common physical downlink control channel (PDCCH), and determining a location of the group common PDSCH based on information received in the group common PDCCH. Some examples of the method, apparatuses, or non-transitory computer-readable medium described herein may further include processes, features, means, or instructions for determining whether to decode the group common PDSCH based on an indication in the group common PDCCH of whether the group control information has changed from a previously received group control information. In some examples of the method, apparatuses, or non-transitory computer-readable medium described herein, the group common PDCCH is received in a common search space with cyclic redundancy check (CRC) scrambled by a group common radio network temporary identifier (RNTI).

Some examples of the method, apparatuses, or non-transitory computer-readable medium described herein may further include processes, features, means, or instructions for receiving grouping information in radio resource control (RRC) signaling, determining that the UE belongs to a particular group based on the grouping information, and determining an index within the group for receiving the resources of the shared channel. In some instances, the group control information includes one or more grants for a plurality of UEs belonging to the particular group. In some instances, the group control information includes grants for scheduled UEs in the particular group and excludes grants for unscheduled UEs in the particular group, wherein the grants for scheduled UEs in the particular group are sorted according to the index in the group.

Some examples of the method, apparatuses, or non-transitory computer-readable medium described herein may further include processes, features, means, or instructions for determining whether the UE is scheduled based on a bitmap field included in the group control information, and determining the resources if it is determined that the UE is scheduled. Some examples of the method, apparatuses, or non-transitory computer-readable medium described herein may further include processes, features, means, or instructions for determining a size of a grant for the UE based on a length indicator included in the group control information, and determining the resources based at least in part on the size of the grant. In some instances, the determining the resources comprises determining that at least a portion of the resources overlaps with resources allocated by a grant received in a PDCCH, and communicating on the resources allocated by the grant in the PDCCH. In some instances, the resources for communicating on the shared channel are delayed in time from a time at which the group common PDSCH is received. In some instances, the delay in time comprises 3 ms.

A method of wireless communication is described. The method may include configuring a user equipment (UE) group comprising at least one UE, transmitting, in a group common physical downlink shared channel (PDSCH), group control information for scheduling the at least one UE for communicating on a shared channel, and communicating on the shared channel with the at least one UE.

An apparatus for wireless communication is described. The apparatus may include a processor, a memory in electronic communication with the processor, and instructions stored in the memory. The instructions may be executable by the processor to cause the apparatus to configure a user equipment (UE) group comprising at least one UE, transmit, in a group common physical downlink shared channel (PDSCH), group control information for scheduling the at least one UE for communicating on a shared channel, and communicate on the shared channel with the at least one UE.

A non-transitory computer readable medium storing code for wireless communication is described. The code may include instructions executable by a processor to configure a user equipment (UE) group comprising at least one UE, transmit, in a group common physical downlink shared channel (PDSCH), group control information for scheduling the at least one UE for communicating on a shared channel, and communicate on the shared channel with the at least one UE.

Another apparatus for wireless communication is described. The apparatus may include means for configuring a user equipment (UE) group comprising at least one UE, means for transmitting, in a group common physical downlink shared channel (PDSCH), group control information for scheduling the at least one UE for communicating on a shared channel, and means for communicating on the shared channel with the at least one UE.

Some examples of the method, apparatuses, or non-transitory computer-readable medium described herein may further include processes, features, means, or instructions for transmitting scheduling information for the group common PDSCH in a group common physical downlink control channel (PDCCH). Some examples of the method, apparatuses, or non-transitory computer-readable medium described herein may further include processes, features, means, or instructions for transmitting, in a common search space, the scheduling information in the group common PDCCH with a cyclic redundancy check (CRC) scrambled by a group common radio network temporary identifier (RNTI). In some instances, the group control information includes scheduling grants for scheduled UEs in the UE group and excludes scheduling grants for unscheduled UEs in the UE group.

Some examples of the method, apparatuses, or non-transitory computer-readable medium described herein may further include processes, features, means, or instructions for transmitting a bitmap field in the group control information that indicates scheduled and unscheduled UES within the UE group. Some examples of the method, apparatuses, or non-transitory computer-readable medium described herein may further include processes, features, means, or instructions for transmitting, in radio resource control (RRC) signaling, grouping information indicating that the at least one UE belongs to a particular UE group. Some examples of the method, apparatuses, or non-transitory computer-readable medium described herein may further include processes, features, means, or instructions for including, in the group control information, one or more grants for a plurality of UEs belonging to the particular UE group.

BRIEF DESCRIPTION OF THE DRAWINGS

FIG. 9 is a block diagram illustrating a UE configured according to some embodiments of the present disclosure.

FIG. 10 is a block diagram illustrating a base station configured according to some embodiments of the present disclosure.

DETAILED DESCRIPTION

Figure 1:
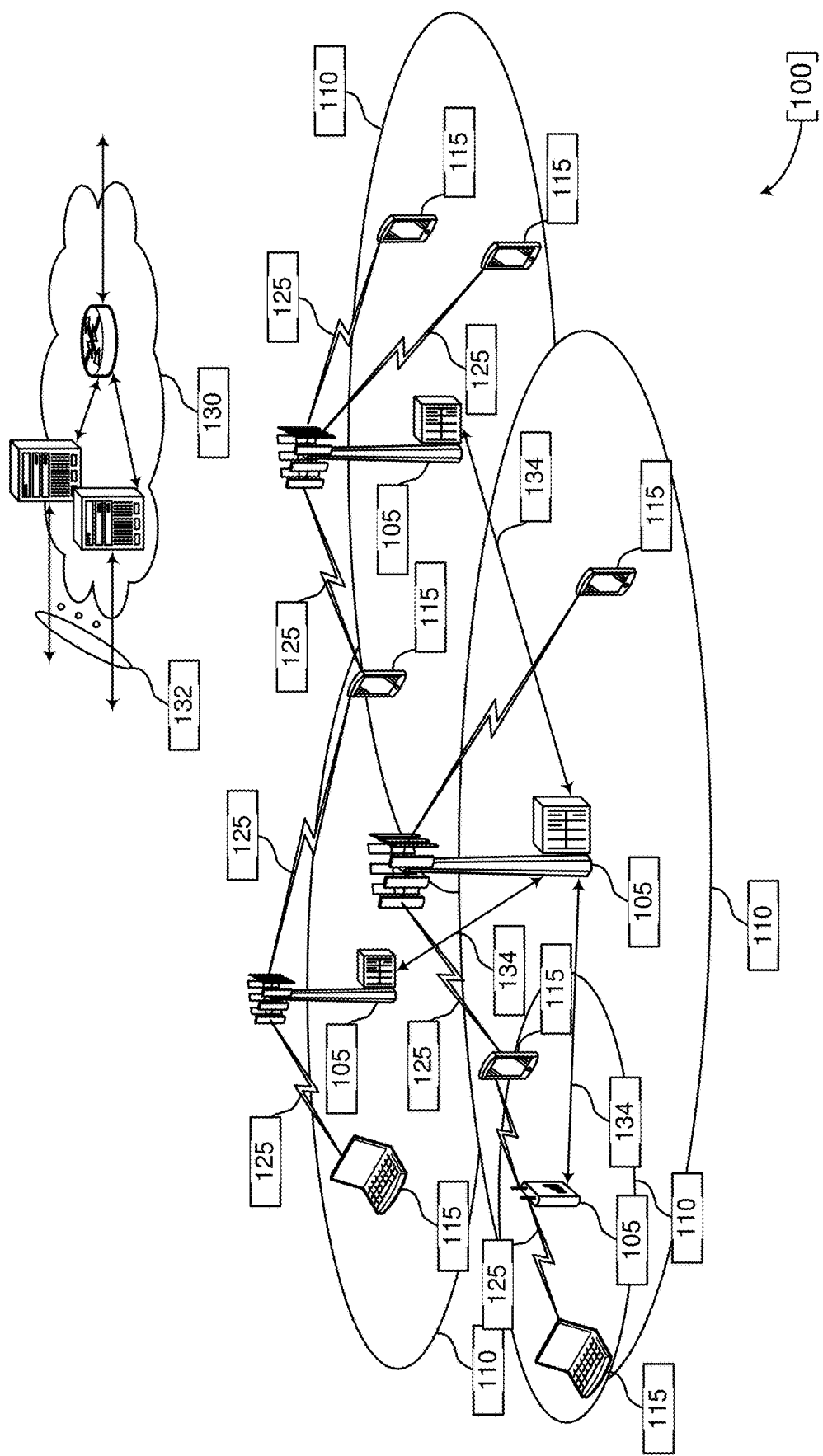
FIG. 1 illustrates an example of a system for wireless communication that supports transmitting group control information on PDSCH in accordance with aspects of the present disclosure.

In various aspects of the disclosure, wireless communications may provide for transmission of group scheduling control information over a physical downlink shared channel (PDSCH) instead of over a physical downlink control channel (PDCCH). As will be described in more detail below, a base station schedules a group of user equipment using a common control information transmission. The base station may first provide, using radio resource control (RRC) signaling, grouping information for one or more user equipment (UE) and a pointer to a group common Physical Downlink Control Channel (PDCCH). The UEs within a particular group may determine, from the group common PDCCH, scheduling information for receiving a group common Physical Downlink Shared Channel (PDSCH), where UEs receive scheduling information for a subsequent downlink or uplink transmission in a shared channel at a later time.

Various deployments of 5G New Radio (NR) may support massive networks of connected devices. In some instances, for example, a connection density for massive Machine Type Communications (mMTC) may comprise up to 1,000,000 devices/$km^2$ in an urban environment. In other deployments, such as an industrial Internet of Things (IoT) factory automation deployment, there may be numerous controllers in a facility, with large numbers of devices per controller, such as over 100 devices in a 10,000 square foot area. For example, multiple sensor/actuator (S/A) units may be controlled by programmable logic controller (PLC) units. Examples of S/A units may include rotary motors, linear servos, actuators, position sensors, etc. The PLC units may receive sensor inputs (e.g., position) from the S/A units and transmit commands to the S/A units in real-time. The traffic profile of communications in a factory automation setting may be mostly periodic, mission-critical communications comprising cyclic exchanges among PLC units and S/A units. The factory environment may include hundreds or thousands of production cells, where cell size may be relatively small compared to cells typically found in wide area networks. In such deployments of densely populated connected devices, not all devices may be sending or receiving messages at once, so massive connectivity may be associated with infrequent traffic but low latency requirements, such as less than 10 seconds on the uplink for a 20-byte application packet measured at a maximum coupling loss of 164 dB.

The support of high user density, however, may require an increase in capacity for data and control channels as the current structure of data and control channels may be insufficient for high user densities. While there are solutions for increasing capacity of a data channel, such as with multi-user multiple-input multiple-output (MIMO) using space division multiple access (SDMA) or non-orthogonal multiple access (NOMA), there may be a particular need for increased capacity of PDCCH in dense connected device environments.

In some instances, PDCCH capacity may be increased by expanding the control region to multiple control regions in a slot. For example, a base station may configure a common control region at the beginning of a slot for all groups of UEs served by the base station, and all the UEs monitor a common search space for receiving the common control region. The base station may configure specific control regions in the slot, each with different starting symbols, for each group of UEs served by the base station. The UEs may monitor UE-specific search spaces in the slot to decode the UE specific control regions based on the group to which a particular UE belongs. The common and UE specific control region configuration, however, reuses PDSCH resources for carrying PDCCH signaling, resulting in significantly reduced PDSCH capacity without dynamic multiplexing of PDSCH with the control region resources. In another example, a single group PDCCH may carry scheduling information for a group of UEs. A single cyclic redundancy check (CRC) (e.g., 24 bits) may be attached to the group PDCCH for overhead reduction, and scheduling information, such as time division resource allocation, can be the same for UEs within the same group to further reduce Downlink Control Information (DCI) size. The group PDCCH configuration may save on resources when compared to PDCCH transmission on a per-UE basis, but the group PDCCH includes scheduling information for all UEs served by the base station. Accordingly, the fixed size of the group PDCCH results in inefficient use of PDCCH resources when fewer than all UEs are scheduled.

As disclosed in the present disclosure, instead of transmitting control information solely on a PDCCH, a base station may transmit control information for a particular group on a group common PDSCH (GC-PDSCH). The control information in the GC-PDSCH may then schedule particular UEs within the group for a communication on the uplink or downlink at a later point in time. The transmission of control information over the GC-PDSCH may increase efficiency since resources for PDSCH transmission can be flexibly allocated in time and frequency, whereas the resources for PDCCH may be limited to the first three symbols of a slot, for example. In certain aspects, the scheduling of GC-PDSCH may be signaled in a group common PDCCH (GC-PDCCH). In some instances, a radio resource configuration (RRC) signaling indicates to a UE the configuration of groups of UEs served by a base station, or the group to which the UE belongs. The UE may also determine the time and frequency resource allocation for receiving the GC-PDCCH based on a pointer or an index received in RRC signaling, as well as a radio network temporary identifier (RNTI) used to scramble a CRC for the GC-PDCCH. Upon receiving the GC-PDCCH, a UE may then determine resources for the GC-PDSCH, which carries DCI for a group of UEs, including UL or DL grants for communication on a shared channel, such as a PDSCH or Physical Uplink Shared Channel (PUSCH) at a later time. As described above, the flexibility and availability of resources in the GC-PDSCH may allow for expanded control channel capacity to meet the demands of massive and densely populated networks, such as mMTC or industrial IoT.

Aspects of the disclosure are initially described in the context of a wireless communications system. Aspects of the disclosure are further illustrated by and described with reference to apparatus diagrams, system diagrams, and flowcharts that relate to transmitting group scheduling control information over PDSCH. The detailed description set forth below, in connection with the appended drawings and appendix, is intended as a description of various configurations and is not intended to limit the scope of the disclosure. Rather, the detailed description includes specific details for the purpose of providing a thorough understanding of the present disclosure. It will be apparent to those skilled in the art that these specific details are not required in every case and that, in some instances, well-known structures and components are shown in block diagram form for clarity of presentation.

This disclosure relates generally to transmitting group scheduling control information over PDSCH. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP Long Term Evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of a new radio (NR) technology. The 5G NR will be capable of scaling to provide coverage (1) to a massive Internet of things (IoTs) with an ultra-high density (e.g., ~1 M nodes/km2), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km2), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth, for example. For other various indoor wideband implementations, using a TDD over the unlicensed portion of the 5 GHz band, the subcarrier spacing may occur with 60 kHz over a 160 MHz bandwidth, for example. Finally, for various deployments transmitting with mmWave components at a TDD of 28 GHz, subcarrier spacing may occur with 120 kHz over a 500 MHz bandwidth, for example. Other deployments of different subcarrier spacing over different bandwidths are also within the scope of the present disclosure.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs may allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 illustrates an example of a wireless communications system 100 that supports transmitting group scheduling control information over PDSCH in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like. Each access network entity may communicate with UEs 115 through a number of other access network transmission entities, which may be referred to as a radio head, a smart radio head, a remote radio head, or a transmission/reception point (TRP). The functions performed by base stations 105 may be carried out via these network entities (e.g., TRPs). Accordingly, as described herein, the terms TRP, eNB, gNB, and base station may be used interchangeably unless otherwise noted.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like. In some implementations, such as in factory automation settings and as used in certain examples herein, a UE 115 may also refer to a sensor/actuator (S/A) unit 115 that communicates with a programmable logic controller (PLC) that acts as a TRP 105 or base station 105.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention or with minimal human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. In some cases, networks of mMTC devices may require increased control channel capacity to accommodate the large number of devices in a dense mMTC environment. Accordingly, as described herein, a base station 105 may schedule UEs 115 using group scheduling control information transmitted over PDSCH to increase control channel capacity.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130). In some examples, base stations 105 or TRPs 105 may communicate with each other through backhaul links 134 to coordinate transmission and reception of signals with UEs 115. For example, a first base station 105 may determine from CSI reports that transmissions from a neighboring base station 105 are negatively interfering with communications between the first base station 105 and the UE 115. Accordingly, the first base station 105 may inform the neighboring base station 105 via backhaul links 134 of the interference or request that the neighboring base station 105 mute transmissions on certain resources or transmit on different resources.

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115 (e.g., for multiple-input multiple-output (MIMO) operations such as spatial multiplexing, or for directional beamforming). However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ LTE License Assisted Access (LTE-LAA) or LTE-Unlicensed (LTE-U) radio access technology or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band. Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some cases, the antennas of a base station 105 or UE 115 may be located within one or more antennas or antenna arrays, which may support MIMO operations such as spatial multiplexing, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

MIMO wireless systems use a transmission scheme between a transmitting device (e.g., a base station 105) and a receiving device (e.g., a UE 115), where both transmitting device and the receiving device are equipped with multiple antennas. MIMO communications may employ multipath signal propagation to increase the utilization of a radio frequency spectrum band by transmitting or receiving different signals via different spatial paths, which may be referred to as spatial multiplexing. The different signals may, for example, be transmitted by the transmitting device via different antennas or different combinations of antennas. Likewise, the different signals may be received by the receiving device via different antennas or different combinations of antennas. Each of the different signals may be referred to as a separate spatial stream, and the different antennas or different combinations of antennas at a given device (e.g., the orthogonal resource of the device associated with the spatial dimension) may be referred to as spatial layers.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a direction between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain phase offset, timing advance/delay, or amplitude adjustment to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple use antennas or antenna arrays to conduct beamforming operations for directional communications with a UE 115. For instance, signals may be transmitted multiple times in different directions, which may include a signal being transmitted according to different beamforming weight sets associated with different directions of transmission. A receiving device (e.g., a UE 115, which may be an example of a mmW receiving device) may try multiple receive beams when receiving various signals from the base station 105, such as synchronization signals or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of Ts=1/30,720,000 seconds. Time intervals of a communications resource may be organized according to radio frames each having a duration of 10 milliseconds (Tf=307200*Ts). The radio frames may be identified by a system frame number (SFN) ranging from 0 to 1023. Each frame may include ten subframes numbered from 0 to 9, and each subframe may have a duration of 1 millisecond. A subframe may be further divided into two slots each having a duration of 0.5 milliseconds, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In 5G NR deployments, a radio frame may have a duration of 10 ms, and one slot may comprise 14 OFDM symbols, but the number of slots in a 5G NR radio frame may vary due to flexible numerology resulting in a flexible time-slot structure. In particular, the numerology for 5G NR may include sub-carrier spacings of 15 kHz, 30 kHz, 60 kHz, or 120 kHz, depending on the system configuration and bandwidth. For example, with increased sub-carrier spacing, the symbol duration decreases while the radio frame duration would remain the same. Accordingly, if the sub-carrier spacing is increased from 15 kHz to 30 kHz, the duration of each slot is halved, resulting in 20 slots within the 10 ms radio frame.

In some wireless communications systems, a slot may further be divided into multiple mini-slots containing one or more symbols and, in some instances, a symbol of a mini-slot or a mini-slot may be the smallest unit of scheduling. In some deployments, such as in 5G NR, each symbol may vary in duration depending on the subcarrier spacing or frequency band of operation, for example. Some wireless communications systems may implement slot aggregation in which multiple slots or mini-slots may be aggregated together for communication between a UE 115 and a base station 105.

A resource element may consist of one symbol period (e.g., a duration of one modulation symbol) and one sub-carrier (e.g., a 15 kHz frequency range). A resource block may contain 12 consecutive subcarriers in the frequency domain (e.g., collectively forming a "carrier") and, for a normal cyclic prefix in each orthogonal frequency-division multiplexing (OFDM) symbol, 7 consecutive OFDM symbol periods in the time domain, or 84 total resource elements across the frequency and time domains. The number of bits carried by each resource element may depend on the modulation scheme (the configuration of modulation symbols that may be applied during each symbol period). Thus, the more resource elements that a UE 115 receives and the higher the modulation scheme (e.g., the higher the number of bits that may be represented by a modulation symbol according to a given modulation scheme), the higher the data rate may be for the UE 115. In MIMO systems, a wireless communications resource may refer to a combination of a radio frequency spectrum band resource, a time resource, and a spatial resource (e.g., spatial layers), and the use of multiple spatial layers may further increase the data rate for communications with a UE 115.

The term "carrier" refers to a set of radio frequency spectrum resources having a defined organizational structure for supporting uplink or downlink communications over a communication link 125. For example, a carrier of a communication link 125 may include a portion of a radio frequency spectrum band that may also be referred to as a frequency channel. In some examples a carrier may be made up of multiple sub-carriers (e.g., waveform signals of multiple different frequencies). A carrier may be organized to include multiple physical channels, where each physical channel may carry user data, control information, or other signaling.

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, or 20 MHz for LTE). In 5G NR, the carrier bandwidth may range from 5 MHz up to 100 MHz for sub-6 GHz frequency spectrum, and from 50 MHz up to 400 MHz for mmW frequency spectrum (above 24 GHz frequency spectrum). In some examples the system bandwidth may refer to a minimum bandwidth unit for scheduling communications between a base station 105 and a UE 115. In other examples a base station 105 or a UE 115 may also support communications over carriers having a smaller bandwidth than the system bandwidth. In such examples, the system bandwidth may be referred to as "wideband" bandwidth and the smaller bandwidth may be referred to as a "narrowband" bandwidth. In some examples of the wireless communications system 100, wideband communications may be performed according to a 20 MHz carrier bandwidth and narrowband communications may be performed according to a 1.4 MHz carrier bandwidth.

Devices of the wireless communications system 100 (e.g., base stations or UEs 115) may have a hardware configuration that supports communications over a particular carrier bandwidth, or may be configurable to support communications over one of a set of carrier bandwidths. For example, base stations 105 or UEs 115 may perform some communications according to a system bandwidth (e.g., wideband communications), and may perform some communications according to a smaller bandwidth (e.g., narrowband communications). In some examples, the wireless communications system 100 may include base stations 105 and/or UEs that can support simultaneous communications via carriers associated with more than one different bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may use a combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

As depicted in FIG. 1, a UE 115 may communicate over wireless communication links 125 with a particular serving base station 105. In particular, a base station 105 may schedule a number of UEs 115 by transmitting grants in a PDCCH on the downlink of communications link 125. The grants on the PDCCH allocate resources for UEs 115 to communicate on a shared channel on the uplink or downlink. In some instances, such as in factory automation or mMTC environments, a base station 105 may serve an extremely large number of UEs 115, so the base station 105 may schedule resources for the UEs using group control information that effectively increases control channel signaling capacity. Multiple UEs 115 may be grouped together, and the base station 105 may transmit grouping information in RRC signaling to the UEs 115. The UEs 115 may then determine, based on the grouping information in RRC signaling, a location of a GC-PDCCH for receiving scheduling for a GC-PDSCH. The base station 105 may then include group control information, including grants for a later communication, for a group of UEs in the GC-PDSCH instead of in the PDCCH, and transmit the GC-PDSCH over communication links 125 to schedule the UEs 115. Other procedures and details for transmitting group control information over PDSCH are described herein.

Figure 2:
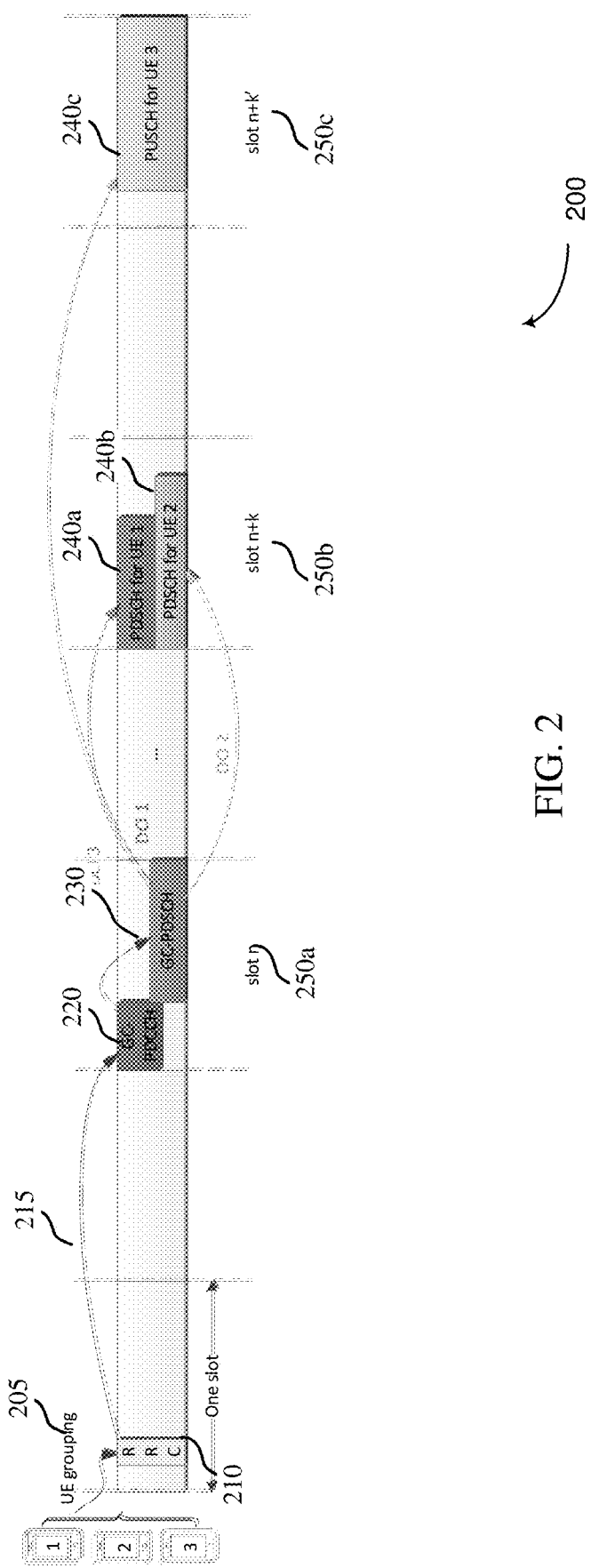
FIG. 2 illustrates an example timeline for transmitting group control information over PDSCH in accordance with aspects of the present disclosure.

FIG. 2 illustrates an example timeline 200 for transmitting group control information over PDSCH, in accordance with various aspects of the present disclosure. As seen in FIG. 2, a base station 105 may configure one or more UEs 115 into a group 205. In the illustrated example, three UEs 115 are configured as one group. The base station 105 may then transmit grouping information in RRC signaling 210 to the UEs 115 in the group 205 to indicate to the UEs 115 the group to which they belong as well as the information needed for receiving group control information in a physical channel. For example, the base station 105 may include, in the grouping information in RRC signaling 210, the UE 115 grouping 205 and a pointer 215 to a GC-PDCCH 220. In certain cases, the pointer 215 may comprise time and frequency domain resource allocation and the RNTI for the GC-PDCCH 220 (e.g., the group common RNTI used to scramble the GC-PDCCH 220). In some instances, the grouping information may contain an index that the UEs 115 may use to determine the resources for receiving the GC-PDCCH 220. Other examples of grouping information that allows the UEs 115 to determine a location of the GC-PDCCH 220 are also within the scope of the present disclosure.

In the illustrated example, the grouping information indicates to the UEs 115 that a GC-PDCCH 220 for the group of UEs 205 will arrive on particular resources in a particular slot 250a. The UEs 115 may then receive the GC-PDCCH 220, which may include information scheduling a GC-PDSCH 230. In some instances, the GC-PDSCH 230 is scheduled in the same slot 250a as the GC-PDCCH 220. In certain cases, the base station 105 includes scheduling or grants for each of the UEs 115 within group 205 in the GC-PDSCH 230, while in other cases, the base station 105 may schedule a subset of the UEs 115 within group 205. The scheduled UEs 115 may then receive the grants or scheduling and use the granted resources for communication at a later time. The grants included in GC-PDSCH 230, for example, may schedule a first UE 115 for receiving a PDSCH 240a in a later slot 250b, a second UE 115 for receiving a PDSCH 240b in the same slot 250b, and a third UE 115 for transmitting a PUSCH 240c in a different, subsequent slot 250c.

In some examples, the control information in GC-PDCCH 220 and/or the GC-PDSCH 230 is attached with a single cyclic redundancy check (CRC) (e.g., 24 bit CRC), or the control information of multiple UEs 115 is joint coded. The single CRC and joint coding for group scheduling may reduce control overhead signaling. In addition, overhead signaling may be further reduced by allowing a variable payload size for the GC-PDSCH 230. That is, the base station 105 may include the group control information of only UEs 115 in a group that are currently scheduled for communication while omitting control information of UEs 115 that are not currently scheduled. The dynamic payload size of GC-PDSCH 230 may provide flexibility for the base station 105 to manage grouping of the control information, especially when UEs 115 within a group 205 may be experiencing different channel conditions. A group scheduling message intended for all UEs 115 within a group would need to have modulation or coding accommodating the UE 115 experiencing the worst channel conditions out of the UEs 115 in the group, resulting in inefficient use of resources for scheduling. The base station 105, however, may dynamically remove a UE 115 (e.g., a UE 115 experiencing poor channel conditions) from the group control information instead of reconfiguring the group 205. In some instances, the base station 105 may indicate the presence or absence of scheduling information in GC-PDSCH 230 for a particular UE 115 using a bitmap field in the MAC Payload Data Unit (PDU) of the GC-PDSCH 230, as described in further detail below with respect to FIG. 3.

The base station 105 may further increase efficiency and UE power saving by indicating whether a current GC-PDSCH 230 has changed from the previous GC-PDSCH 230. In some instances, the change indicator may be included as a one-bit indicator in the DCI of GC-PDCCH 220. The UE 115 may then determine, from the change indicator, whether there is a change in the current GC-PDSCH 230 of scheduled UEs 115 and whether the UE 115 should accordingly skip decoding of the GC-PDSCH 230 for power saving. For example, if a UE 115 was not scheduled by GC-PDSCH 230 in a previous period and determines from the change indicator that there is no change in UE scheduling in the current period, then the UE 115 may skip the decoding of the current GC-PDSCH 230 to save power.

Figure 3:
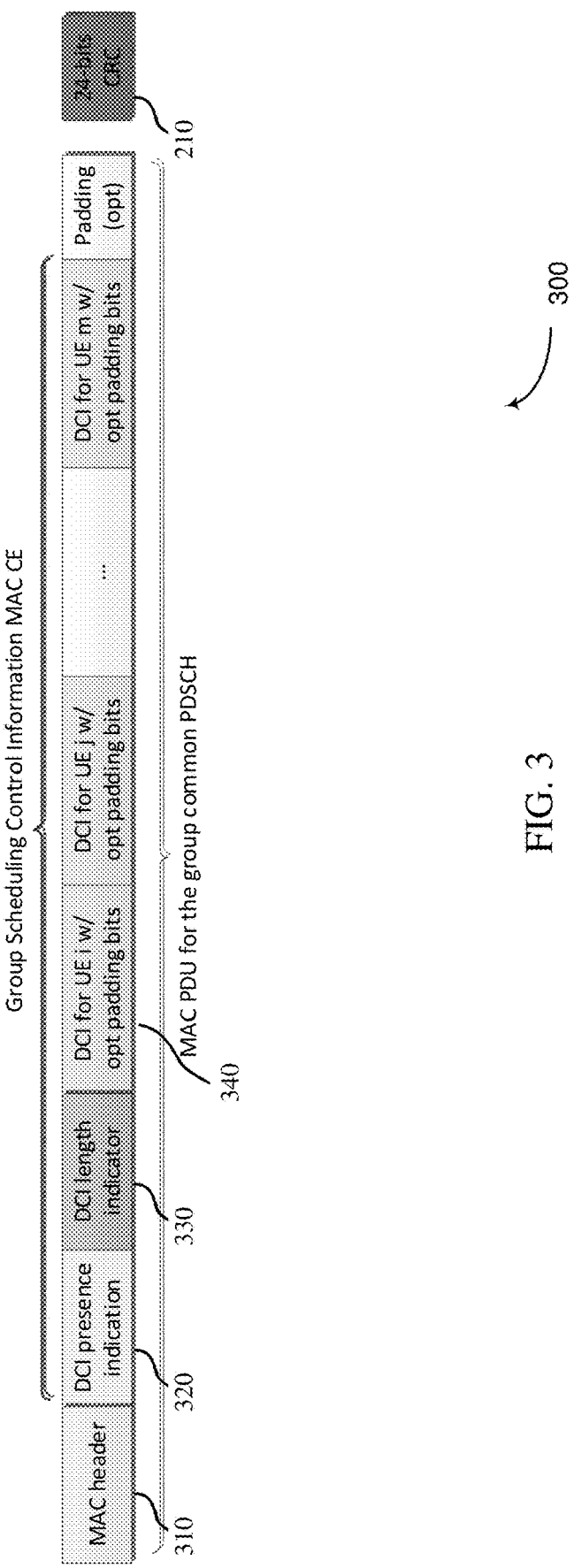
FIG. 3 illustrates an example MAC Payload Data Unit (PDU) for a group common PDSCH transmission in accordance with various aspects of the present disclosure.

FIG. 3 illustrates an example MAC Payload Data Unit (PDU) 300 for a GC-PDSCH transmission. The MAC PDU 300 may have a MAC header 310, followed by a downlink control information (DCI) presence indication 320. The DCI presence indication 320 may indicate, to UEs 115 within the group that are receiving the particular GC-PDSCH, whether a particular UE 115 is scheduled by the current GC-PDSCH message. In some instances, the DCI presence indication 320 may include a bitmap indicating which UEs 115 within a group are scheduled. In some instances, the DCI presence indication 320 may be included in the GC-PDCCH, instead of in the MAC PDU 300 for the GC-PDSCH, if there are sufficient reserved bits in the DCI of the GC-PDCCH. The inclusion of the DCI presence indication 320 in GC-PDCCH may allow a UE 115 to know whether it is currently scheduled and provides an opportunity for the UE 115 to skip decoding the GC-PDSCH for power savings if the UE 115 is not currently scheduled. The MAC PDU 300 may also include a DCI length indicator 330, which defines the length of the DCI for each scheduled UE 115 in the MAC PDU 300. In some cases, if the actual length of a particular DCI 340 for a scheduled UE 115 is less than the length provided in the DCI length indicator 330, the base station 105 may include additional padding bits to that DCI 340. The order of the DCI 340 for scheduled UEs 115 in the MAC PDU 300 may be based on the ordering of UE indications in the bitmap in the DCI presence indication 320, on an index associated with UEs 115 within the group, or on other configuration parameters. In certain instances, the MAC PDU 300 may also separately provide both UL and DL grants for a UE 115. In this situation, each UE 115 may be configured with two indices, one for DL transmission and another for UL transmission, and the DCI presence indication 320 may separately indicate the presence of UL and DL scheduling for a UE 115.

Returning to FIG. 2, the scheduling of unicast shared channel transmissions occurs at a time period before the actual shared channel transmission. The base station 105 may schedule UEs 115 using a particular timeline that results in a delay from reception of the grant in GC-PDSCH 230 and the communication 240 on the PDSCH or PUSCH. As can be seen in FIG. 2, for a GC-PDSCH 230 received in slot n 250a, the communication of unicast data can be in slot n+k, where the value of k is $k_0+3N_{slot}^{subframe}+1$ for DL and $k_2+3N_{slot}^{subframe}+1$ for UL, where $k_0$ is the delay in slots between the DL grant and corresponding DL data reception on PDSCH and $k_2$ is the delay in slots between the reception of the UL grant (in the downlink) and the transmission of UL data in PUSCH. In some instances, $k_0$ and $k_2$ are indicated in the associated DCI for each unicast UL or DL communication. The delay introduced by the described timeline 200 may comprise approximately 3 ms, in the illustrated example, when compared to scheduling using normal PDCCH. The delay may allow the UE to accommodate the longer decoding time of PDSCH when compared to PDCCH and the longer PHY/MAC interaction time for determining scheduling control information. Other delay times are also within the scope of the present disclosure.

Figure 4:
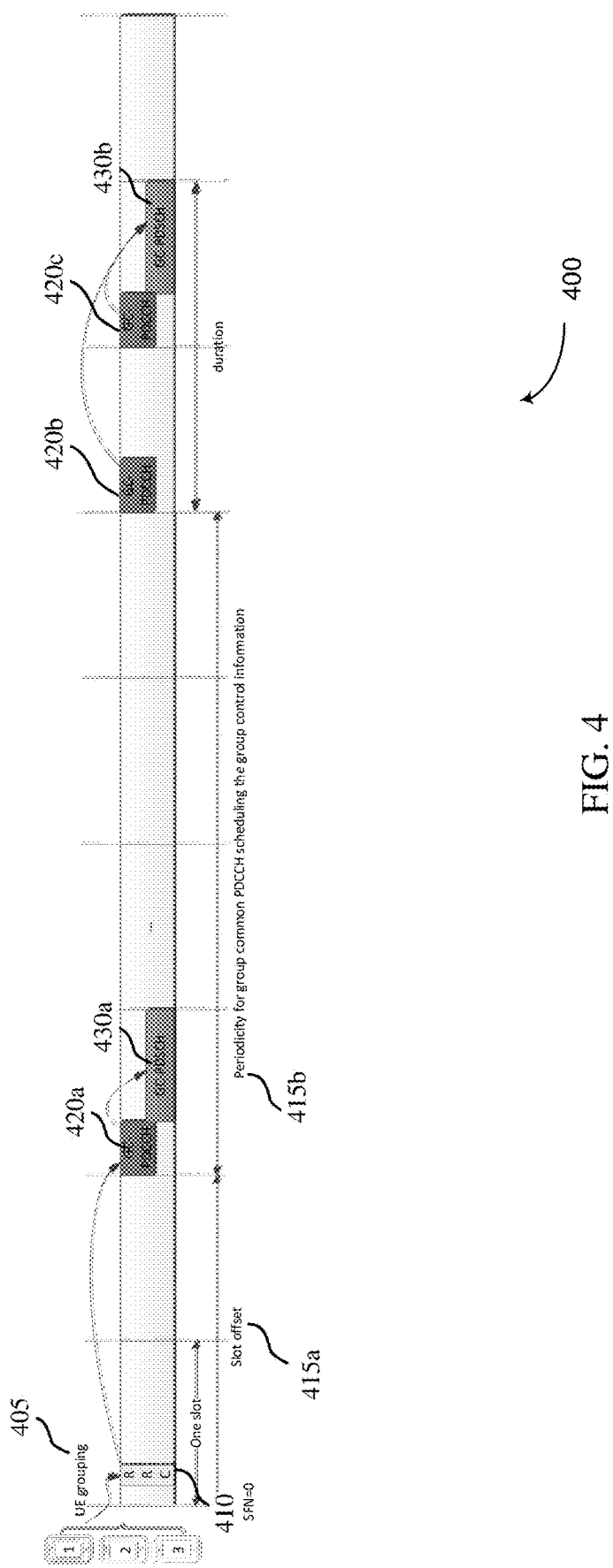
FIGS. 4-5 illustrate example timelines for transmitting group control information over PDSCH in accordance with aspects of the present disclosure.

As discussed above with respect to FIG. 2, the grouping information in RRC signaling may inform the UE 115 where to receive and monitor the GC-PDCCH that schedules the GC-PDSCH. FIG. 4 illustrates a timeline 400 showing one example of the type of information that may indicate to the UE 115 where to receive the GC-PDCCH. As seen in FIG.

4, the base station 105 may include a slot offset 415a and a periodicity 415b associated with the GC-PDCCH 420a. The slot offset 415a may indicate a number of slots after the slot in which the RRC signaling 410 with the grouping information 405 is received for expecting the GC-PDCCH 420a. In the illustrated example, the slot offset 415a may indicate that the GC-PDCCH 420a will arrive after a delay of one slot after the slot in which RRC 410 is received. The periodicity 415b may indicate a period of time, in slots, for which one or more GC-PDCCH 420a are configured to schedule a particular GC-PDSCH 430a transmission. In other words, for the indicated period 415b, each GC-PDCCH 420a in the period 415b is intended to schedule a particular GC-PDSCH 430a. In some instances, for example, multiple copies 420b and 420c of the same GC-PDCCH are transmitted, and both copies 420b and 420c of the GC-PDCCH schedule the same GC-PDSCH 430b, as illustrated in FIG. 4. In certain situations, the base station 105 may transmit the GC-PDCCH 420 in a common search space with CRC scrambled by a configured group RNTI.

The DCI for scheduling of GC-PDSCH may be based on the DL grant used to schedule unicast PDSCH or include some of the same information used for scheduling unicast PDSCH (i.e., DCI format 1_0). For example, the DCI for scheduling of GC-PDSCH may include some of the same fields used in scheduling for unicast PDSCH, including fields providing frequency domain resource assignment, time domain resource assignment, modulation and coding scheme (MCS), VRB-to-PRB mapping, and redundancy version. Some fields used in DCI for scheduling unicast PDSCH, however, may not apply to scheduling of GC-PDSCH, such as the Hybrid Automatic Repeat Request (HARM) process number or new data indicator. In some instances, the timeline for GC-PDCCH scheduling of GC-PDSCH may be based on the timeline for scheduling of unicast PDSCH (e.g., based on $K_0$ indicated in the DCI of PDCCH).

In some situations, a communication scheduled by GC-PDSCH for a UE 115 may "collide" with another communication scheduled by PDCCH for the same UE 115. As used herein, a collision of scheduling refers to a situation when at least a portion of time or frequency resources scheduled by one grant (e.g., GC-PDSCH) overlaps in time or frequency with a communication scheduled by a different grant (e.g., PDCCH). A predefined rule or set of rules may be used to determine priority of scheduling in case of collision.

Figure 5:
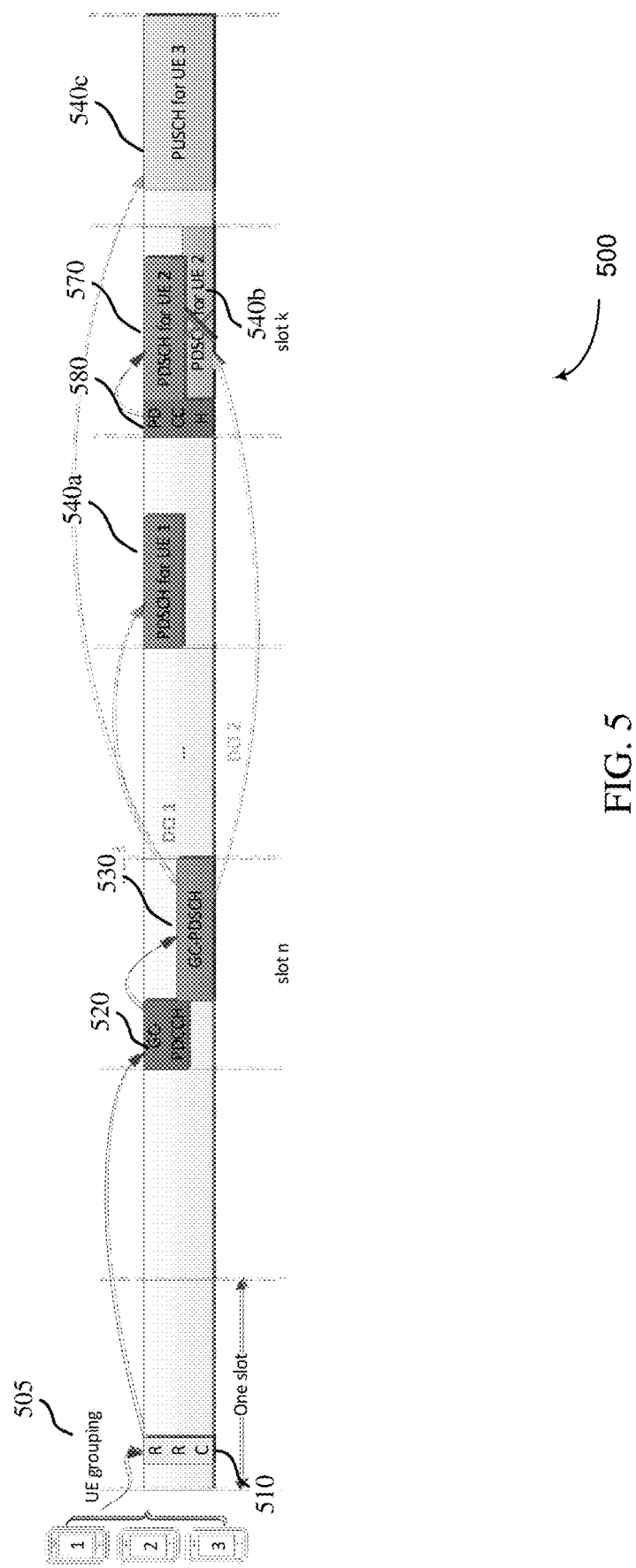

FIG. 5 illustrates a timeline 500 of one example scheduling collision and a rule for determining priority. As depicted in FIG. 5, a base station 105 may schedule a group 505 of UEs 115 using GC-PDSCH 530 as described herein. The grants transmitted in GC-PDSCH 530 may schedule a first UE 115 for receiving PDSCH 540a, a second UE 115 for receiving PDSCH 540b, and a third UE 115 for transmitting PUSCH 540c. As illustrated, there is a delay between the GC-PDSCH 530 transmission and the scheduled PDSCH 540b transmission for the second UE 115, and a separate grant is received by the second UE 115 via PDCCH 580 that schedules the UE 115 for receiving a different PDSCH transmission 570. In the present example, however, the resources for PDSCH 570 overlap in part in the same slot with the resources for PDSCH 540b. Accordingly, there is a collision of scheduling for the second UE 115. In the illustrated example, the UE 115 may select one of the scheduled PDSCH transmission based on a priority of scheduled transmissions. In some instances, a transmission scheduled via PDCCH 580 has priority over a transmission scheduled via GC-PDSCH 530, so the UE 115 may prioritize decoding of the PDSCH 570 scheduled by PDCCH 580 over the PDSCH 540b scheduled by GC-PDSCH 530.

Figure 6:
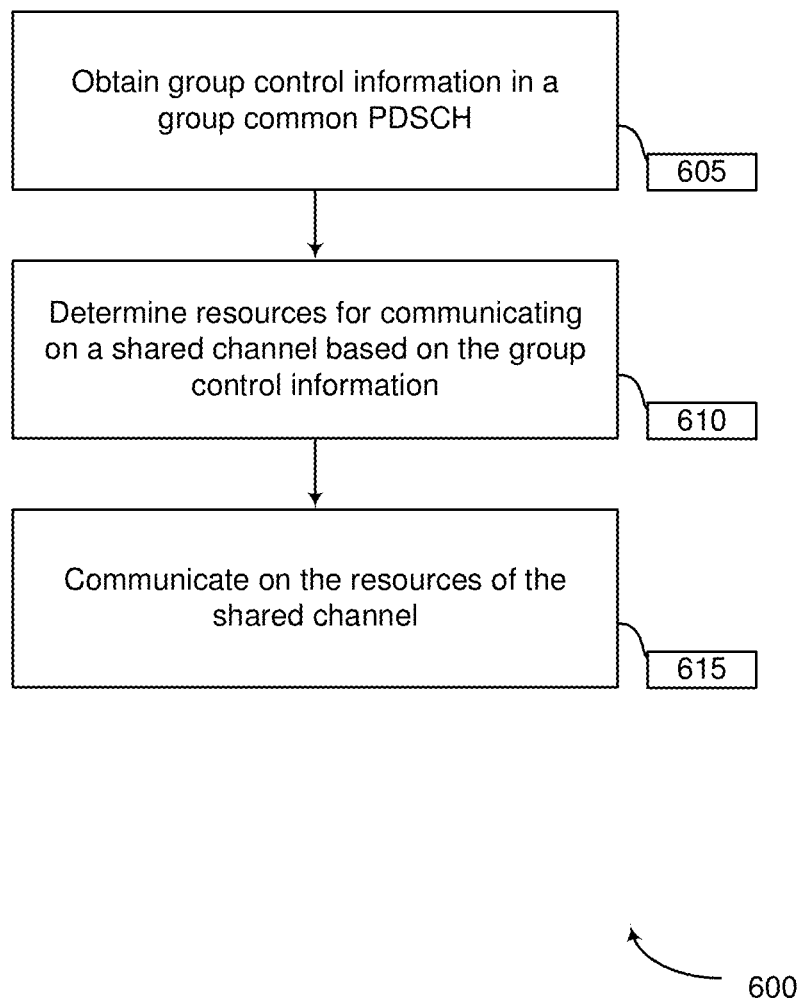
FIGS. 6-7 illustrate methods for transmission of group control information on PDSCH in accordance with aspects of the present disclosure.

FIG. 6 shows a flowchart illustrating a process 600 performed by a user equipment (UE) 115 for receiving group control information in a PDSCH in accordance with various aspects of the present disclosure. The operations of process 600 may be implemented by a UE 115 or its components, as described with reference to FIGS. 1 and 8. For example, the operations of process 600 may be performed by the processor 880, either alone or in combination with other components, as described herein. In some examples, the UE 115 may execute a set of codes to control the functional elements of the device to perform the functions described below. Additionally or alternatively, the UE 115 may perform aspects of the functions described below using special-purpose hardware.

At 605, the UE 115 obtains group control information in a group common PDSCH. In some instances, the UE 115 receives a group common PDCCH and determines a location of the group common PDSCH based on information received in the group common PDCCH. In some instances, the UE 115 determines whether to decode the group common PDSCH based on an indication in the group common PDCCH of whether the group control information has changed from a previously received group control information. In some instances, the group common PDCCH is received in a common search space with cyclic redundancy check (CRC) scrambled by a group common RNTI. In some instances, the UE 115 receives grouping information in radio resource control (RRC) signaling, determines that the UE 115 belongs to a particular group based on the grouping information, and determines an index within the group for receiving the resources of the shared channel. In some instances, the group control information includes one or more grants for a plurality of UEs belonging to the particular group. In some instances, the grant information includes at least one of a downlink grant or an uplink grant for the UE. In some instances, the group control information includes grants for scheduled UEs in the particular group and excludes grants for unscheduled UEs in the particular group, wherein the grants for scheduled UEs in the particular group are sorted according to the index in the group.

At 610, the UE 115 determines resources for communicating on a shared channel based on the group control information. In some instances, the UE 115 determines whether the UE is scheduled based on a bitmap field included in the group control information, and determines the resources if it is determined that the UE is scheduled. In some instances, the UE 115 determines a size of a grant for the UE based on a length indicator included in the group control information, and determines the resources based at least in part on the size of the grant. In some instances, the UE 115 obtains the grant for the UE based on the determined the size of the grant and the bitmap indication that the UE is scheduled, and determines resources for communicating on a shared channel based on the determined grant. In some instances, the determining the resources comprises determining that at least a portion of the resources overlaps with resources allocated by a grant received in a PDCCH, and communicating on the resources allocated by the grant in the PDCCH. At 615, the UE 115 communicates on the resources of the shared channel.

Figure 7:
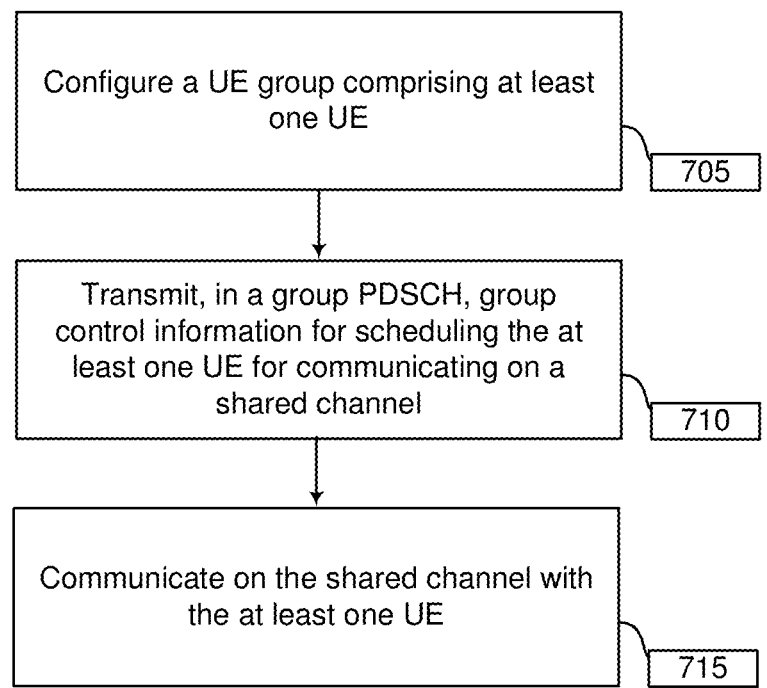

FIG. 7 shows a flowchart illustrating a process 700 performed by a base station 105 for transmitting group control information in PDSCH in accordance with various aspects of the present disclosure. The operations of process 700 may be implemented by a base station 105 or its components, as described with reference to FIGS. 1 and 8. For example, the operations of process 700 may be performed by the processor 840, either alone or in combination with other components, as described herein. In some examples, the base station 105 may execute a set of codes to control the functional elements of the device to perform the functions described below. Additionally or alternatively, the base station 105 may perform aspects of the functions described below using special-purpose hardware.

At 705, the base station 105 configures a UE group comprising at least one UE. At 710, the base station 105 transmits, in a group PDSCH, group control information for scheduling the at least one UE for communicating on a shared channel. In some instances, the base station 105 transmits scheduling information for the group common PDSCH in a group common physical downlink control channel (PDCCH). In certain instances, the base station 105 transmits, in a common search space, the scheduling information in the group common PDCCH with a cyclic redundancy check (CRC) scrambled by a group common radio network temporary identifier (RNTI). The group control information may include scheduling grants for scheduled UEs in the UE group and excludes scheduling grants for unscheduled UEs in the UE group. In some instances, the base station 105 transmits a bitmap field in the group control information that indicates scheduled and unscheduled UES within the UE group. The base station 105 may transmit, in radio resource control (RRC) signaling, grouping information indicating that the at least one UE belongs to a particular UE group. The base station 105 may include, in the group control information, one or more grants for a plurality of UEs belonging to the particular UE group. At 715, the base station 105 communicates on the shared channel with the at least one UE.

Figure 8:
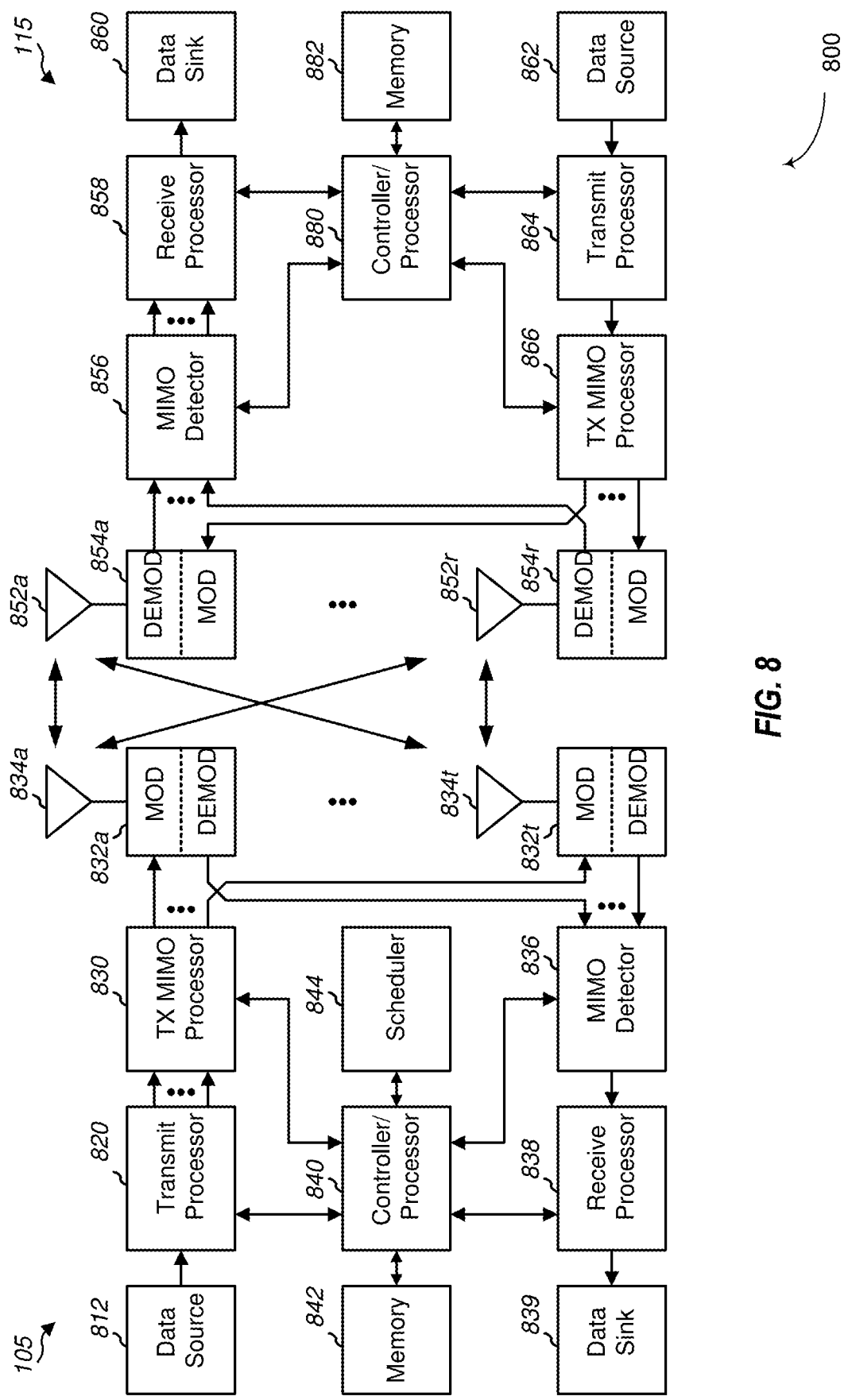
FIG. 8 is a block diagram illustrating a design of a base station/gNB/TRP and a UE configured according to one aspect of the present disclosure.

FIG. 8 shows a block diagram 800 of a design of a base station/eNB 105 and a UE 115, which may be one of the base stations/eNBs and one of the UEs in FIG. 1. At the eNB 105, a transmit processor 820 may receive data from a data source 812 and control information from a controller/processor 840. The control information may be for various control channels such as the PBCH, PCFICH, PHICH, PDCCH, EPDCCH, MPDCCH etc. The data may be for the PDSCH, etc. The transmit processor 820 may process (e.g., encode and symbol map) the data and control information to obtain data symbols and control symbols, respectively. The transmit processor 820 may also generate reference symbols, e.g., for the PSS, SSS, and cell-specific reference signal. A transmit (TX) multiple-input multiple-output (MIMO) processor 830 may perform spatial processing (e.g., precoding) on the data symbols, the control symbols, and/or the reference symbols, if applicable, and may provide output symbol streams to the modulators (MODs) 832a through 832t. Each modulator 832 may process a respective output symbol stream (e.g., for OFDM, etc.) to obtain an output sample stream. Each modulator 832 may further process (e.g., convert to analog, amplify, filter, and upconvert) the output sample stream to obtain a downlink signal. Downlink signals from modulators 832a through 832t may be transmitted via the antennas 834a through 834t, respectively. The downlink signals may include references signals such as CSI-RS or synchronization signals, which may be used by the UE 115 to measure channel conditions for reporting to the base station 105. The downlink signals may also include scheduling information for scheduling a group common PDSCH or delayed unicast shared channel communications, as described above with reference to FIGS. 2-7.

At the UE 115, the antennas 852a through 852r may receive the downlink signals from the eNB 105 and may provide received signals to the demodulators (DEMODs) 854a through 854r, respectively. Each demodulator 854 may condition (e.g., filter, amplify, downconvert, and digitize) a respective received signal to obtain input samples. Each demodulator 854 may further process the input samples (e.g., for OFDM, etc.) to obtain received symbols. A MIMO detector 856 may obtain received symbols from all the demodulators 854a through 854r, perform MIMO detection on the received symbols if applicable, and provide detected symbols. A receive processor 858 may process (e.g., demodulate, deinterleave, and decode) the detected symbols, provide decoded data for the UE 115 to a data sink 860, and provide decoded control information to a controller/processor 880.

On the uplink, at the UE 115, a transmit processor 864 may receive and process data (e.g., for the PUSCH) from a data source 862 and control information (e.g., for the PUCCH) from the controller/processor 880. The transmit processor 864 may also generate reference symbols for a reference signal. The symbols from the transmit processor 864 may be precoded by a TX MIMO processor 866 if applicable, further processed by the modulators 854a through 854r (e.g., for SC-FDM, etc.), and transmitted to the eNB 105. The transmissions to the eNB 105 may include channel measurement reports such as CSI reports, for example. At the eNB 105, the uplink signals from the UE 115 may be received by the antennas 834, processed by the demodulators 832, detected by a MIMO detector 836 if applicable, and further processed by a receive processor 838 to obtain decoded data and control information sent by the UE 115. The processor 838 may provide the decoded data to a data sink 839 and the decoded control information to controller/processor 840.

The controllers/processors 840 and 880 may direct the operation at the eNB 105 and the UE 115, respectively. The controller/processor 840 and/or other processors and modules at the eNB 105 may perform or direct the execution of the functional blocks illustrated in FIG. 7, and/or other various processes for the techniques described herein. The controllers/processor 880 and/or other processors and modules at the UE 115 may also perform or direct the execution of the functional blocks illustrated in FIG. 6, and/or other processes for the techniques described herein. The memories 842 and 882 may store data and program codes for the eNB 105 and the UE 115, respectively. For example, memory 842 may store instructions that, when performed by the processor 840 or other processors depicted in FIG. 8, cause the base station 105 to perform operations described with respect to FIG. 7. Similarly, memory 882 may store instructions that, when performed by processor 880 or other processors depicted in FIG. 8 cause the UE 115 to perform operations described with respect to FIG. 6. A scheduler 844 may schedule UEs for data transmission on the downlink and/or uplink.

While blocks in FIG. 8 are illustrated as distinct components, the functions described above with respect to the blocks may be implemented in a single hardware, software, firmware, or combination component or in various combinations of components. For example, the functions described with respect to the transmit processor 820, the receive processor 838, or the TX MIMO processor 830 may be performed by or under the control of processor 840.

Turning now to FIG. 9, a UE 900, such as a UE 115 (see FIG. 8), may have a controller/processor 880, a memory 882, and antennas 852a through 852r, as described above with respect to FIG. 8. UE 900 may also have wireless radios 901a to 901r that comprise additional components also described above with reference to FIG. 8. The memory 882 of UE 900 stores one or more algorithms that configure processor/controller 880 to carry out one or more procedures including, for example, those described above with reference to FIG. 6.

One or more algorithms stored by memory 882 configure processor/controller 880 to carry out one or more procedures relating to wireless communication by the UE 900, as previously described. For example, a control information manager 902 may configure controller/processor 880 to obtain group control information received in a PDSCH by wireless radios 901a to 901r. Additionally, shared channel manager 904 may configure controller/processor 880 to carry out operations including determining resources for communicating on a shared channel based on group control information. Also, a communication manager 906 may configure controller/processor 880 to carry out operations including communicating, via wireless radios 901a to 901r, on the resources of the shared channel. Other operations as described above may be carried out by one or more of the described algorithms or components 902, 904, 906 and/or their various subcomponents.

Each of the illustrated components 902, 904, and 906 and/or at least some of their various sub-components may be implemented in hardware, software executed by a processor, firmware, or any combination thereof. If implemented in software executed by a processor, the functions of the control information manager 902, shared channel manager 904, communication manager 906 and/or at least some of their various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The control information manager 902, shared channel manager 904, communication manager 906 and/or at least some of their various sub-components may be physically located at various positions, including being distributed such that portions of functions are implemented at different physical locations by one or more physical devices. In some examples, control information manager 902, shared channel manager 904, communication manager 906 and/or at least some of their various sub-components may be a separate and distinct component in accordance with various aspects of the present disclosure. In other examples, control information manager 902, shared channel manager 904, communication manager 906 and/or at least some of their various sub-components may be combined with one or more other hardware components, including but not limited to an I/O component, a transceiver, a network server, another computing device, one or more other components described in the present disclosure, or a combination thereof in accordance with various aspects of the present disclosure.

Referring now to FIG. 10, a base station 1000, such as a base station 105 (see FIG. 8), may have a controller/processor 840, a memory 842, and antennas 834a through 834t, as described above. The base station 1000 may also have wireless radios 1001a to 1001t that comprise additional components also described above with reference to FIG. 8. The memory 842 of base station 1000 stores one or more algorithms that configure processor/controller 840 to carry out one or more procedures as described above with reference to FIG. 7.

One or more algorithms stored by memory 842 configure processor/controller 840 to carry out one or more operations relating to wireless communication by the base station 1000, as previously described. For example, a grouping manager 1002 configures controller processor 840 to carry out operations that include configuring a UE group comprising at least one UE. In addition, a scheduling manager 1004 configures controller processor 840 to carry out operations that include generating group control information for scheduling the at least one UE for communicating on a shared channel. In some instances, a communication manager 1006 configures controller processor 840 to carry out operations that include transmitting, using wireless radios 1001a-r, the group control information generated by the scheduling manager 1004 on a group common PDSCH and also communicating on the shared channel with the at least one UE. Other operations as described above may be carried out by one or more of the described algorithms or components 1002, 1004, 1006 and/or their various subcomponents.

Each of the illustrated components 1002, 1004, and 1006 and/or at least some of their various sub-components may be implemented in hardware, software executed by a processor, firmware, or any combination thereof. If implemented in software executed by a processor, the functions of the grouping manager 1002, scheduling manager 1004, communication manager 1006 and/or at least some of their various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The grouping manager 1002, scheduling manager 1004, communication manager 1006 and/or at least some of their various sub-components may be physically located at various positions, including being distributed such that portions of functions are implemented at different physical locations by one or more physical devices. In some examples, grouping manager 1002, scheduling manager 1004, communication manager 1006 and/or at least some of their various sub-components may be a separate and distinct component in accordance with various aspects of the present disclosure. In other examples, grouping manager 1002, scheduling manager 1004, communication manager 1006 and/or at least some of their various sub-components may be combined with one or more other hardware components, including but not limited to an I/O component, a transceiver, a network server, another computing device, one or more other components described in the present disclosure, or a combination thereof in accordance with various aspects of the present disclosure.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   receiving, at a user equipment (UE), a group common physical downlink control channel (PDCCH) associated a particular group that comprises a plurality of UEs including the UE;
   obtaining, at the UE and associated with receiving the group common PDCCH, group control information in a group common physical downlink shared channel (PDSCH), wherein the group control information includes one or more grants for a subset of the plurality of UEs belonging to the particular group;
   decoding the group control information based on an indication in the group common PDCCH that the group control information has changed from a previously received group control information; and
   communicating on resources for communication on a shared channel based on the group control information.

2. The method of claim 1, further comprising:
   determining a location of the group common PDSCH based on information received in the group common PDCCH.

3. The method of claim 1, wherein the group common PDCCH is received in a common search space with cyclic redundancy check (CRC) scrambled by a group common radio network temporary identifier (RNTI).

4. The method of claim 1, further comprising:
   receiving grouping information in radio resource control (RRC) signaling;
   determining that the UE belongs to the particular group based on the grouping information; and
   determining an index within the particular group for receiving the resources of the shared channel.

5. The method of claim 4, wherein the group control information includes grants for scheduled UEs in the particular group and excludes grants for unscheduled UEs in the particular group, wherein the grants for scheduled UEs in the particular group are sorted according to the index in the particular group.

6. The method of claim 1, further comprising:
   determining, based on a bitmap field included in the group control information, whether the UE is scheduled by the group control information to communicate on the shared channel; and
   determining the resources for communication if it is determined that the UE is scheduled.

7. The method of claim 1, further comprising:
   determining a size of a grant for the UE based on a length indicator included in the group control information; and
   determining the resources based at least in part on the size of the grant.

8. The method of claim 1, wherein the communicating on the resources comprises:
   determining that at least a portion of the resources overlaps with resources allocated by a grant received in a PDCCH; and
   communicating on the resources allocated by the grant in the PDCCH.

9. The method of claim 1, wherein the resources for communicating on the shared channel are delayed in time from a time at which the group common PDSCH is received.

10. The method of claim 9, wherein the delay in time comprises 3 milliseconds.

11. The method of claim 1, wherein the group common PDCCH comprises a medium access control (MAC) payload data unit (PDU) comprising an indication of a presence in the group common PDSCH of scheduling information for the UE.

12. The method of claim 11, wherein the MAC PDU comprises a downlink control information (DCI) comprising the indication.

13. An apparatus for wireless communications, comprising:
   a processor;
   memory in electronic communication with the processor; and
   instructions stored in the memory and operable, when executed by the processor, to cause the apparatus to:
      receive, at a user equipment (UE), a group common physical downlink control channel (PDCCH) associated a particular group that comprises a plurality of UEs including the UE;
      obtain, at the UE and associated with receiving the group common PDCCH, group control information in a group common physical downlink shared channel (PDSCH), wherein the group control information includes one or more grants for a subset of the plurality of UEs belonging to the particular group;
      decode the group common PDSCH based on an indication in the group common PDCCH that the group control information has changed from a previously received group control information;
      communicate on resources for communication on a shared channel based on the group control information.

14. The apparatus of claim 13, wherein the instructions are further operable to cause the apparatus to:

determine a location of the group common PDSCH based on information received in the group common PDCCH.

15. The apparatus of claim 13, wherein the group common PDCCH is received in a common search space with cyclic redundancy check (CRC) scrambled by a group common radio network temporary identifier (RNTI).

16. The apparatus of claim 13, wherein the instructions are further operable to cause the apparatus to:
receive grouping information in radio resource control (RRC) signaling;
determine that the UE belongs to the particular group based on the grouping information; and
determine an index within the particular group for receiving the resources of the shared channel.

17. The apparatus of claim 16, wherein the group control information includes grants for scheduled UEs in the particular group and excludes grants for unscheduled UEs in the particular group, wherein the grants for scheduled UEs in the particular group are sorted according to the index in the particular group.

18. The apparatus of claim 13, wherein the instructions are further operable to cause the apparatus to:
determine, based on a bitmap field included in the group control information, whether the UE is scheduled by the group control information to communicate on the shared channel; and
determine the resources for communication if it is determined that the UE is scheduled.

19. The apparatus of claim 13, wherein the instructions are further operable to cause the apparatus to:
determine a size of a grant for the UE based on a length indicator included in the group control information; and
determine the resources based at least in part on the size of the grant.

20. The apparatus of claim 13, wherein the instructions to cause the apparatus to communicate on the resources are further operable to cause the apparatus to:
determine that at least a portion of the resources overlaps with resources allocated by a grant received in a PDCCH; and
communicate on the resources allocated by the grant in the PDCCH.

21. The apparatus of claim 13, wherein the resources for communicating on the shared channel are delayed in time from a time at which the group common PDSCH is received.

22. A method for wireless communication, comprising:
configuring a user equipment (UE) group comprising a plurality of UEs;
transmitting a group common physical downlink control channel (PDCCH) associated with the UE group;
transmitting, in a group common physical downlink shared channel (PDSCH) and based on transmitting the group common PDCCH, group control information, wherein the group control information includes at least one scheduling grant for scheduling a subset of the plurality of UEs belonging to the UE group for communicating on a shared channel, and wherein the group common PDCCH comprises an indication that the group control information has changed from a previously transmitted group control information; and
communicating on the shared channel with the subset of the plurality of UEs.

23. The method of claim 22, further comprising:
transmitting scheduling information for the group common PDSCH in the group common PDCCH.

24. The method of claim 22, wherein the group control information includes scheduling grants for scheduled UEs in the UE group and excludes scheduling grants for unscheduled UEs in the UE group.

25. An apparatus for wireless communications, comprising:
a processor;
memory in electronic communication with the processor; and
instructions stored in the memory and operable, when executed by the processor, to cause the apparatus to:
configure a user equipment (UE) group comprising a plurality of UEs;
transmit a group common physical downlink control channel (PDCCH) associated with the UE group;
transmit, in a group common physical downlink shared channel (PDSCH) and based on transmitting the group common PDCCH, group control information, wherein the group control information includes at least one scheduling grant for scheduling a subset of the plurality of UEs belonging to the UE group for communicating on a shared channel, and wherein the group common PDCCH comprises an indication that the group control information has changed from a previously transmitted group control information; and
communicate on the shared channel with the subset of the plurality of UEs.

26. The apparatus of claim 25, wherein the instructions are further operable to cause the apparatus to transmit scheduling information for the group common PDSCH in the group common PDCCH.

27. The apparatus of claim 26, wherein the instructions to cause the apparatus to transmit the group common PDCCH are further operable to cause the apparatus to transmit, in a common search space, the scheduling information in the group common PDCCH with a cyclic redundancy check (CRC) scrambled by a group common radio network temporary identifier (RNTI).

28. The apparatus of claim 25, wherein the group control information includes scheduling grants for scheduled UEs in the UE group and excludes scheduling grants for unscheduled UEs in the UE group.

29. The apparatus of claim 28, wherein the instructions to cause the apparatus to transmit the group control information, are further operable to cause the apparatus to transmit a bitmap field in the group control information that indicates scheduled and unscheduled UEs within the UE group.

30. The apparatus of claim 25, wherein the instructions are further operable to cause the apparatus to transmit, in radio resource control (RRC) signaling, grouping information indicating that the plurality of UEs belong to the UE group.

* * * * *